United States Patent
Kakimoto (10) Patent No.: US 10,164,717 B2
(45) Date of Patent: Dec. 25, 2018

(54) OPTICAL SIGNAL TRANSMISSION DEVICE AND ELECTRONIC APPARATUS USING SAME

(71) Applicant: TAIYO YUDEN CO., LTD., Tokyo (JP)

(72) Inventor: Hiroya Kakimoto, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/676,685

(22) Filed: Aug. 14, 2017

(65) Prior Publication Data

US 2017/0346571 A1 Nov. 30, 2017

Related U.S. Application Data (63) Continuation-in-part of application No. PCT/JP2016/050478, filed on Jan. 8, 2016.

(30) Foreign Application Priority Data

Feb. 16, 2015 (JP) .................................. 2015-028096
Oct. 27, 2015 (JP) .................................. 2015-210659

(51) Int. Cl.
*H04B 10/80* (2013.01)
*G02B 6/36* (2006.01)
(Continued)

(52) U.S. Cl.
CPC ......... *H04B 10/801* (2013.01); *G02B 6/3604* (2013.01); *G02B 6/43* (2013.01);
(Continued)

(58) Field of Classification Search
CPC .. H04B 10/801; H04B 10/14; H04B 10/6166; G02B 6/3604; G02B 6/43; G08C 23/04
See application file for complete search history.

(56) References Cited

U.S. PATENT DOCUMENTS 3,428,812 A * 2/1969 Burke .................... B64G 1/22
250/236
3,977,793 A * 8/1976 Trotta .................. G02B 27/642
250/347
(Continued)

FOREIGN PATENT DOCUMENTS

JP   H2-148399 A    6/1990
JP   H8-181664 A    7/1996
(Continued)

OTHER PUBLICATIONS

English translation of Written Opinion (PCT/ISA/237) issued in PCT/JP2016/050478 dated Mar. 2016.
(Continued)

*Primary Examiner* — Peter Radkowski
(74) *Attorney, Agent, or Firm* — Chen Yoshimura LLP (57) ABSTRACT

A rotary joint includes a fixed unit and a rotating unit arranged substantially orthogonal to a center axis and facing one another, as well as a substantially cylindrical light guide member arranged therebetween. A light-emitting device and a light-receiving device are provided on each of the units. The light guide member is configured such that an amount of the light from the light-emitting device on the fixed unit that is received by the light-receiving device on the rotating unit and an amount of the light from the light-emitting device on the rotating unit that is received by the light-receiving device on the fixed unit both exceed a prescribed minimum amount regardless of rotational positions of the rotating unit.

12 Claims, 6 Drawing Sheets

(51) Int. Cl.
*G02B 6/43* (2006.01)
*G08C 23/04* (2006.01)
*H04B 10/114* (2013.01)
*H04B 10/00* (2013.01)
*H04B 10/61* (2013.01)

(52) U.S. Cl.
CPC ......... *G08C 23/04* (2013.01); *H04B 10/1143* (2013.01); *H04B 10/14* (2013.01); *H04B 10/22* (2013.01); *H04B 10/6166* (2013.01)

(56) References Cited

U.S. PATENT DOCUMENTS

| | | | | |
|---|---|---|---|---|
| 4,027,945 A * | 6/1977 | Iverson | G02B 6/3524 | 385/115 |
| 4,109,997 A * | 8/1978 | Iverson | G02B 6/3524 | 385/26 |
| 4,109,998 A * | 8/1978 | Iverson | G02B 6/3524 | 250/208.6 |
| 4,258,976 A * | 3/1981 | Scott | G02B 27/642 | 385/115 |
| 4,313,228 A * | 1/1982 | Berstein | H04B 10/1143 | 137/392 |
| 4,460,242 A * | 7/1984 | Birch | G02B 6/3604 | 250/227.11 |
| 4,872,737 A * | 10/1989 | Fukahori | G02B 6/3604 | 385/25 |
| 5,073,040 A * | 12/1991 | Guinard | G02B 6/3504 | 385/26 |
| 5,157,745 A * | 10/1992 | Ames | G02B 6/3604 | 385/25 |
| 5,271,076 A * | 12/1993 | Ames | G02B 6/32 | 359/900 |
| 5,371,814 A * | 12/1994 | Ames | G02B 6/32 | 385/25 |
| 5,442,721 A * | 8/1995 | Ames | G02B 6/3604 | 385/26 |
| 5,568,578 A * | 10/1996 | Ames | G02B 6/32 | 385/25 |
| 5,828,146 A * | 10/1998 | Lorenz | G02B 6/3604 | 310/68 B |
| 6,359,712 B1 * | 3/2002 | Kamitani | H04B 10/1143 | 398/118 |
| 6,700,709 B1 * | 3/2004 | Fermann | G02B 27/09 | 359/641 |
| 7,373,041 B2 * | 5/2008 | Popp | G02B 6/3604 | 385/26 |
| 7,534,992 B2 * | 5/2009 | Koitabashi | G02B 6/3604 | 250/216 |
| 7,650,054 B2 * | 1/2010 | Merlet | G02B 6/3604 | 385/26 |
| 7,724,996 B2 * | 5/2010 | Popp | G02B 6/3604 | 385/26 |
| 8,041,225 B2 * | 10/2011 | Hemmelmann | G08C 23/04 | 250/208.2 |
| 2005/0036735 A1 * | 2/2005 | Oosterhuis | G02B 6/3604 | 385/26 |
| 2007/0019908 A1 * | 1/2007 | O'Brien | G02B 6/3604 | 385/36 |
| 2007/0053632 A1 * | 3/2007 | Popp | G02B 6/3604 | 385/26 |
| 2007/0140620 A1 * | 6/2007 | Schorpp | G02B 6/3604 | 385/47 |
| 2008/0069495 A1 * | 3/2008 | Hirohashi | G02B 6/3604 | 385/25 |
| 2008/0175535 A1 * | 7/2008 | Popp | G02B 6/3604 | 385/25 |
| 2009/0142017 A1 * | 6/2009 | Merlet | G02B 6/3604 | 385/26 |
| 2010/0195956 A1 * | 8/2010 | Zhang | G02B 6/3604 | 385/26 |
| 2011/0150497 A1 * | 6/2011 | Hemmelmann | G08C 23/04 | 398/141 |

FOREIGN PATENT DOCUMENTS

| | | |
|---|---|---|
| JP | H10-269488 A | 10/1998 |
| JP | 2008-154207 A | 7/2008 |
| JP | 2009-130803 A | 6/2009 |
| JP | 2012-119890 A | 6/2012 |
| JP | 2013-34043 A | 2/2013 |

OTHER PUBLICATIONS

International Search Report (ISR) issued in PCT/JP2016/050478 dated Mar. 2016.
Written Opinion (PCT/ISA/237) issued in PCT/JP2016/050478 dated Mar. 2016.

* cited by examiner

OPTICAL SIGNAL TRANSMISSION DEVICE AND ELECTRONIC APPARATUS USING SAME

BACKGROUND OF THE INVENTION

Technical Field

The present invention relates to an optical signal transmission device and an electronic apparatus using the same that utilize optical signals to implement bidirectional signal transmission in applications such as rotating security cameras or between a rotating unit of an industrial robot and a fixed unit that supports the rotating unit, for example.

Background Art

Figure 5:
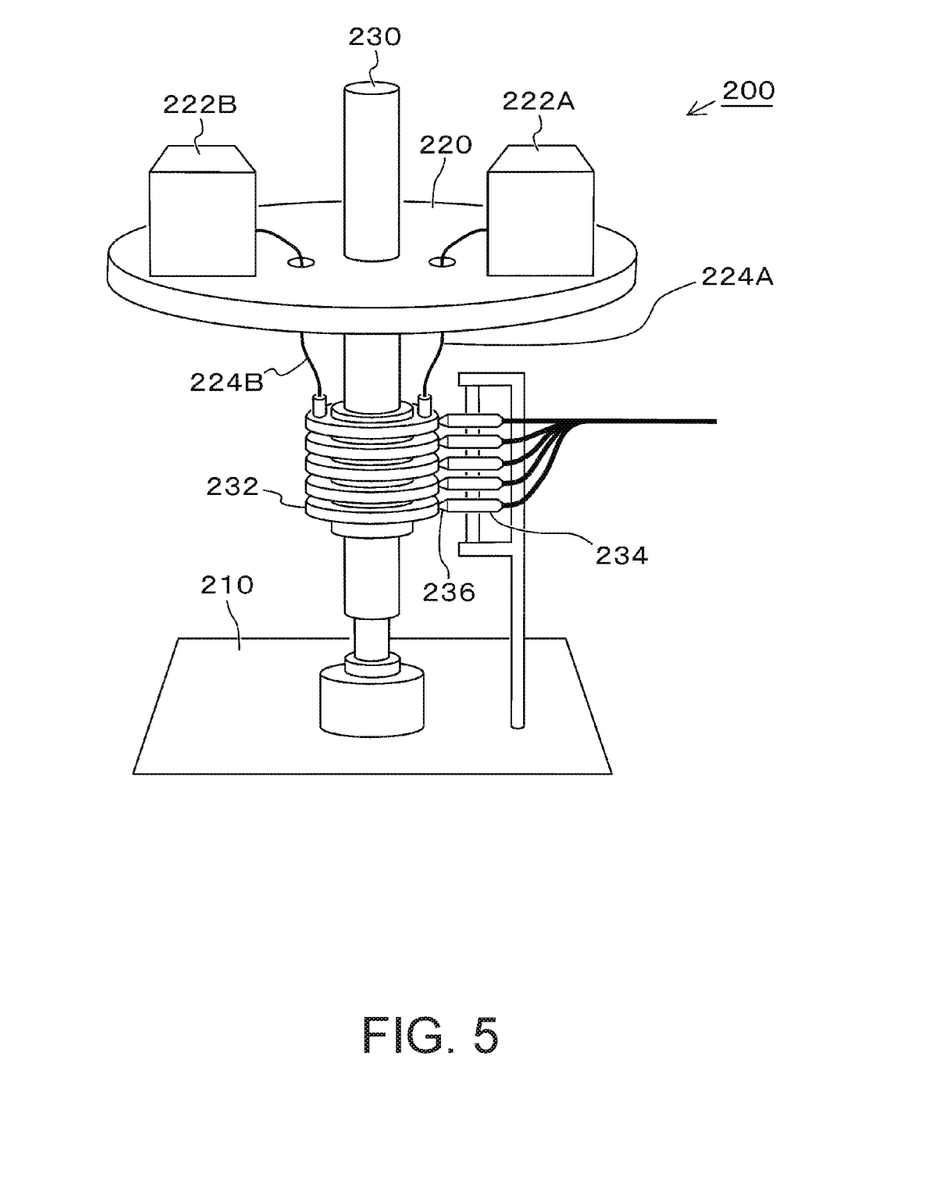
FIG. 5 illustrates an example of a conventional technology.

Transmission of signals between components that rotate relative to one another, such as in rotating security cameras, has conventionally been achieved using slip rings that have mechanical contact points. FIG. 5 illustrates a conventional signal transmission device 200, in which a rotating unit 220 that can rotate about a rotary shaft 230 is arranged facing a fixed unit 210. The rotating unit 220 includes devices 222A and 222B such as a motor, a sensor, and a controller, and wires 224A and 224B that are connected to these devices 222A and 222B are connected to a plurality of slip rings 232 arranged around the periphery of the rotary shaft 230. The plurality of slip rings 232 respectively contact contact points 236 on the ends of brushes 234 to allow signals to be transmitted.

These slip rings 232 have a high probability of causing communication errors within a relatively short period of time due to factors such as accumulation of dust, corrosion, wear, and sliding instabilities in the contact points 236 and therefore present durability issues in terms of the need for regular inspections and replacements. Moreover, increasing data throughput or implementing bidirectional communications requires increasing the number of slip rings 232 and brushes 234, thereby resulting in significant increases in cost. Therefore, contactless communication schemes that utilize optical transmission have been proposed as a solution. Patent Document 1, for example, proposes an approach that involves compensating for insufficiencies in the amount of light received resulting from optical axis offsets due to rotation by arranging a plurality of light-emitting devices or light-receiving devices (see Patent Document 1, FIG. 1).

Another proposed approach involves arranging light-receiving devices on a rotary shaft and, using reflectors or the like, controlling the angle of emitted light emitted from light-emitting devices arranged outwards from the rotary shaft to stabilize the amount of light received by the light-receiving devices during rotation. Although this approach is effective, the precision required to install the reflectors or the like as well as to control the angles thereof presents challenges in terms of manufacturability. Moreover, the mechanisms for rotating the light-emitting devices in circular paths around the light-receiving devices on the rotary shaft tend to be relatively large rotary mechanisms having a diameter of at least twice the distance between the light-receiving devices and the light-emitting devices, which presents obstacles to achieving reductions in size or diameter. Patent Document 2 and Patent Document 3 propose yet another approach, in which light-receiving devices are arranged on a rotary shaft and light-emitting devices arranged outwards from the rotary shaft are arranged at prescribed inclinations so that the emitted light is received stably and consistently even when the light-receiving devices are rotating.

RELATED ART DOCUMENTS

Patent Documents

Patent Document 1: Japanese Patent Application Laid-Open Publication No. H10-269488 (FIG. 1)
Patent Document 2: Japanese Patent Application Laid-Open Publication No. H2-148399
Patent Document 3: Japanese Patent Application Laid-Open Publication No. H8-181664

SUMMARY OF THE INVENTION

However, although the technology disclosed in Patent Document 1 (of compensating for insufficiencies in the amount of light received resulting from optical axis offsets due to rotation by arranging a plurality of light-emitting devices or light-receiving devices) is effective, the increase in the number of devices and peripheral circuits results in increased cost. Moreover, in the technologies disclosed in Patent Document 2 and Patent Document 3, a high level of precision is required to achieve the prescribed angles of inclination for the light-emitting devices, which presents challenges in terms of manufacturability. In addition, similar to in the approach of using reflectors described above, the mechanisms for rotating the light-emitting devices in circular paths around the light-receiving devices on the rotary shaft tend to be relatively large rotary mechanisms having a diameter of at least twice the distance between the light-receiving devices and the light-emitting devices, which presents obstacles to achieving reductions in size or diameter.

The present invention was made in view of the problems described above and aims to provide an optical signal transmission device that makes it possible to achieve reductions in size, diameter, and cost while still ensuring that the light-receiving devices receive a sufficient and consistent amount of light in a bidirectional communication scheme implemented using optical signals. The present invention also aims to provide an electronic apparatus that includes this optical signal transmission device. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an optical signal transmission device, including: a first unit and a second unit arranged substantially orthogonal to a same axis and facing one another, the first unit and the second unit being relatively rotatable to each other about the axis; an optical unit between the first unit and the second unit, wherein each of the first and second units has a light-emitting device and a light-receiving device arranged on a surface thereof facing the other one of the first and second units, the light-emitting device and the light-receiving device being respectively positioned separately from an intersecting point on the surface that intersects with the axis, and wherein the optical unit is configured such that light emitted from the light-emitting device on the first unit is guided to, and is received by, the light-receiving device on the second unit, and light emitted from the light-emitting device on the second unit is guided to, and is received by, the light-receiving device on the first unit, and such that an amount of the light so received by the light-receiving device on the first unit and an amount of the light so received by the light-receiving device on the second unit both exceed a prescribed minimum amount regardless of relative rotational positions of the first unit and the second unit with respect to each other.

In one aspect, the optical unit may include a light guide member interposed between the first unit and the second unit. In another aspect, the optical unit may further include a reflector arranged around the light-emitting device on the first unit and another reflector arranged around the light-emitting device on the second unit, each reflector regulating a light emission range. In another aspect, the optical unit may include a reflector arranged around the light-emitting device on the first unit and another reflector arranged around the light-emitting device on the second unit, each reflector regulating a light emission range. In another aspect, each light-emitting device may be a light-emitting diode. Moreover, in another aspect, an intersection of the first unit and the axis may be located at a substantially center position on a straight line between the light-emitting device and the light-receiving device on the first unit, an intersection of the second unit and the axis may be located at a substantially center position on a straight line between the light-emitting device and the light-receiving device on the second unit, and the straight line on the first unit and the straight line on the second unit may be configured to have substantially equal lengths. In yet another aspect, one of the first and second units may have a power transmitting coil, and another of the first and second units may have a power receiving coil so that power is supplied in a contactless manner between the first and second units.

An electronic apparatus according to the present invention includes the optical signal transmission device according to any one of the aspects described above. The abovementioned and other objectives, features, and advantages of the present invention will be apparent from the detailed descriptions that follow and the attached drawings.

An optical signal transmission device according to the present invention includes: a first member and a second member arranged substantially orthogonal to a same axis and facing one another, the first member and the second member being rotatable about the axis relative to one another; and light-emitting devices and light-receiving devices arranged on respective facing surfaces of the first member and the second member at positions offset from intersections with the axis. Moreover, light emitted from a light-emitting device of the first member is received by a light-receiving device of the second member, light emitted from a light-emitting device of the second member is received by a light-receiving device of the first member, and the optical signal transmission device further includes a light reception amount securing unit that ensures that the light-receiving devices receive an amount of light required for communication even when optical axis offsets occur due to relative rotation between the first member and the second member. This makes it possible to achieve reductions in size and diameter while the light-receiving devices still receive a stable and consistent amount of light in a bidirectional communication scheme implemented using optical signals. Furthermore, no high-precision adjustments are required for the optical axes, the light guide member, the light-emitting devices, or the light-receiving devices, thereby making it possible to reduce costs.

It is to be understood that both the foregoing general description and the following detailed description are exemplary and explanatory, and are intended to provide further explanation of the invention as claimed.

BRIEF DESCRIPTION OF THE DRAWINGS

FIGS. 1B-1 and 1B-2 are explanatory drawings illustrating the effects of not including a light guide member.

FIGS. 4A and 4B illustrate a rotating security camera that uses the rotary joint according to Embodiment 1.

DETAILED DESCRIPTION OF EMBODIMENTS

Preferred embodiments of the present invention will be described in detail below.

Embodiment 1

Figure 1A:
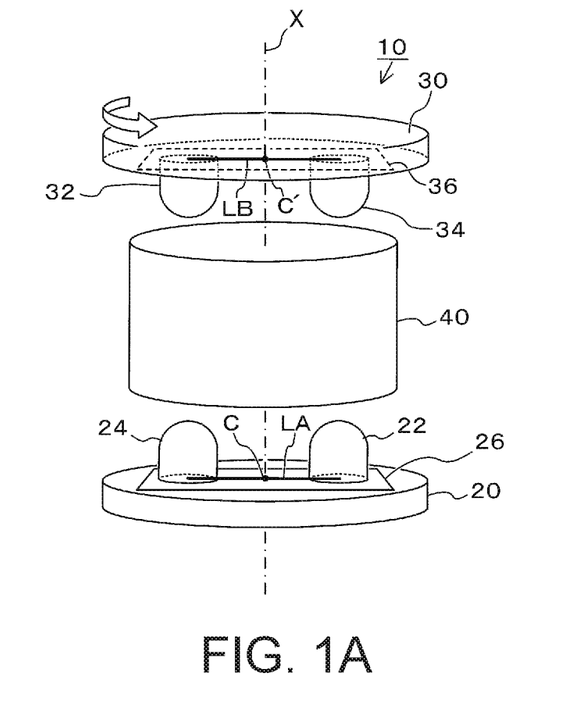
FIG. 1A is an exterior perspective view illustrating the basic structure of a rotary joint according to Embodiment 1 of the present invention.
Figure 1B:
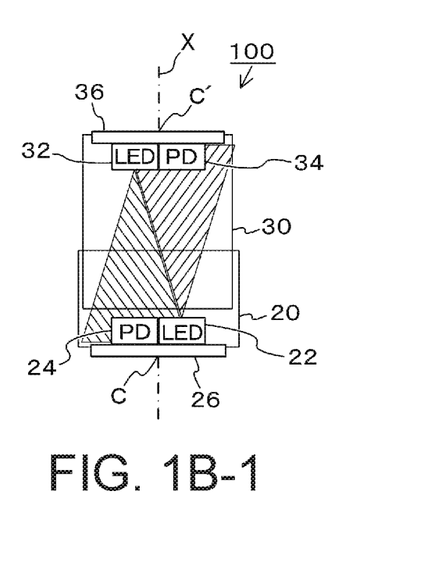
Figure 1B:
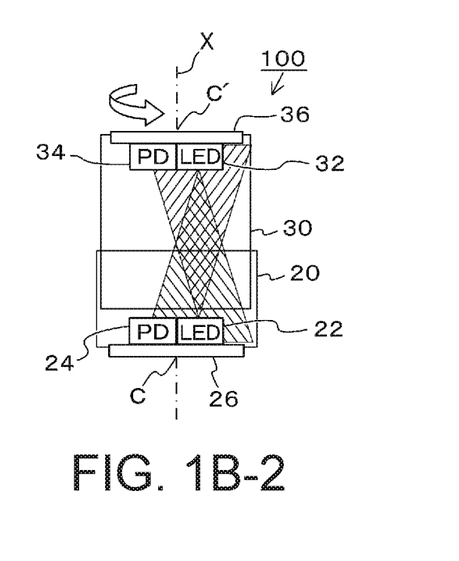
Figure 2A:
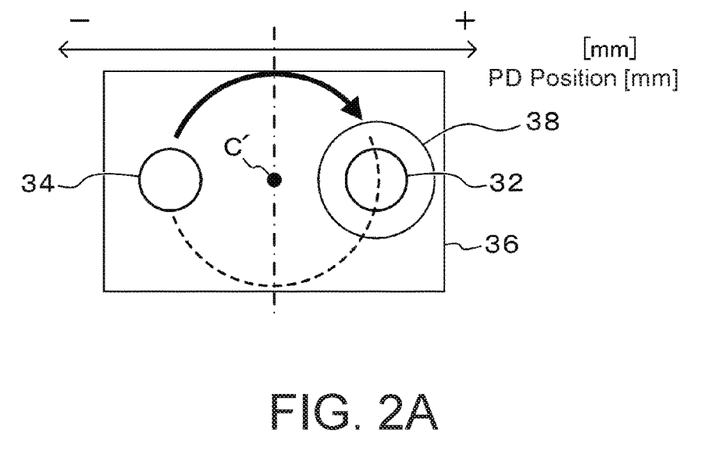
FIG. 2A is a plan view illustrating the arrangement of devices on a rotating unit side of the rotary joint according to Embodiment 1.
Figure 2B:
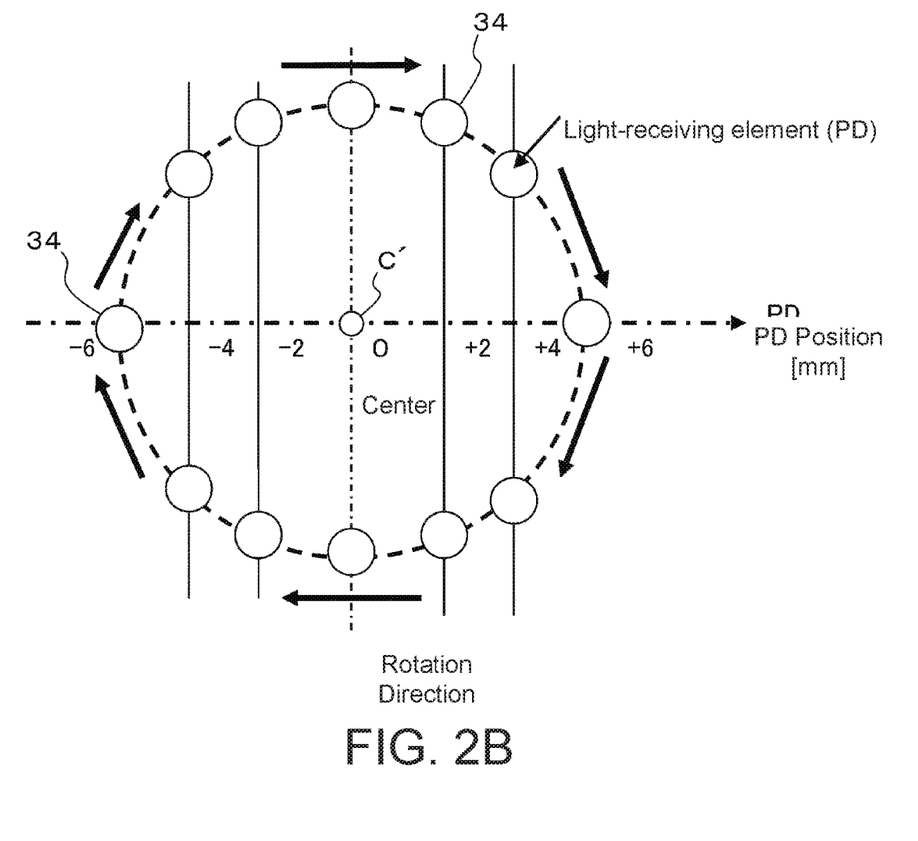
FIG. 2B illustrates the changes in position of light-receiving devices when the rotating unit rotates.
Figure 3A:
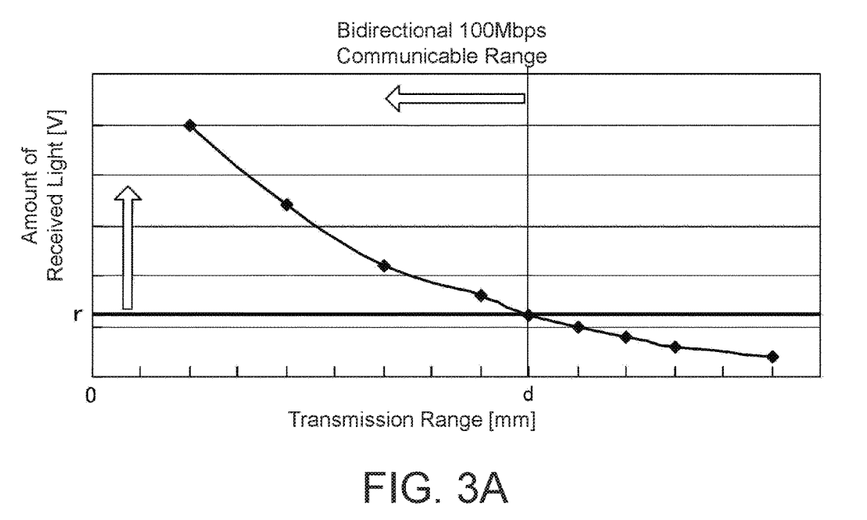
FIG. 3A illustrates the relationship between communication distance and the amount of light received.
Figure 3B:
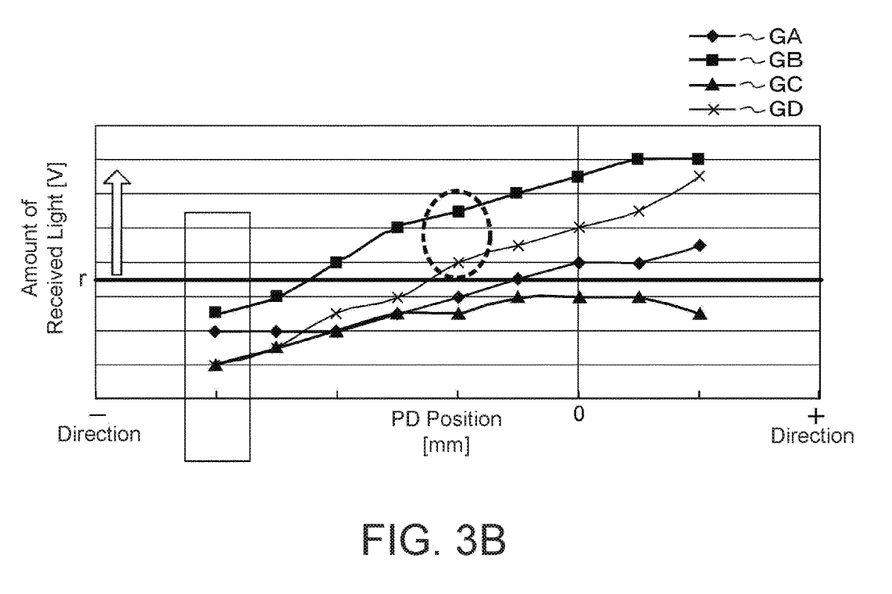
FIG. 3B illustrates the relationship between the position of a light-receiving device (PD) and the amount of light received when properties of the light guide member are changed.

First, Embodiment 1 of the present invention will be described with reference to FIGS. 1 to 3. In the present embodiment, the optical signal transmission device of the present invention is applied to a rotary joint as an example. FIG. 1A is an exterior perspective view illustrating the basic structure of the rotary joint according to the present embodiment, and FIGS. 1B-1 and 1B-2 illustrate the operation of a rotary joint when no light guide member is included. FIG. 2A is a plan view illustrating the arrangement of devices on a rotating unit side of the rotary joint according to the present embodiment, and FIG. 2B illustrates the changes in position of a light-receiving device when the rotating unit rotates. FIG. 3A illustrates the relationship between communication distance and the amount of light received, and FIG. 3B illustrates the relationship between the position of a light-receiving device (PD) and the amount of light received when properties of the light guide member are changed.

As illustrated in FIG. 1A, a rotary joint 10 according to the present embodiment includes a fixed unit 20 and a rotating unit 30 arranged substantially orthogonal to the same center axis X and facing one another, as well as a substantially cylindrical light guide member 40 arranged therebetween. The fixed unit 20 includes a light-emitting device 22, a light-receiving device 24, and a device circuit 26. The rotating unit 30 includes a light-emitting device 32, a light-receiving device 34, and a device circuit 36. Light emitted from the light-emitting device 22 of the fixed unit 20 is received by the light-receiving device 34 of the rotating unit 30, and light emitted from the light-emitting device 32 of the rotating unit 30 is received by the light-receiving device 24 of the fixed unit 20, thereby making it possible to transmit optical signals in a bidirectional manner. In the present embodiment, light-emitting diodes (LEDs) that allow light to spread easily are used for the light-emitting devices 22 and 32, and photodiodes (PDs) are used for the light-receiving devices 24 and 34. The light-receiving devices 24 and 34 convert the LED light emitted by the light-emitting devices 22 and 32 into electrical signals (that is, voltages) to implement communication. The voltages produced by the light-receiving devices 24 and 34 correspond to the amount of light received. In other words, the amount of light received can be converted to a voltage value. Moreover, as illustrated in FIG. 2A, reflectors 38 are arranged as necessary around the peripheries of the light-emitting devices 22 and 32 to restrict light emission range.

As illustrated in FIG. 1A, an intersection C of the fixed unit 20 and the center axis X is present at a substantially center position on a straight line LA between the light-emitting device 22 and the light-receiving device 24, and an intersection C' of the rotating unit 30 and the center axis X is present at a substantially center position on a straight line LB between the light-emitting device 32 and the light-receiving device 34. The intersection C' is the center of rotation of the rotating unit 30. The straight line LA and the straight line LB are configured to have substantially equal lengths. Here, "substantially center positions on the straight lines LA and LB" refers not only to the exact centers of these straight lines but also to positions that include a small amount of error (up to approximately 10%, for example). Moreover, the lengths of the straight lines LA and LB do not necessarily have to be exactly the same and can be changed within the allowable range of offsets in the center positions of the straight lines LA and LB relative to the intersection C or C'.

For example, letting an arrangement position of the light-emitting device 22 on the fixed unit 20 side be a, letting an arrangement position of the light-receiving device 24 be b, and letting a center point between a and b on a straight line between a and b (the straight line LA in FIG. 1A) be c, these positions are set such that a rotational axis position y (the intersection C) on the fixed unit 20 satisfies the relationship $y=c\pm(a-b)\times 0.1$. In other words, the light-emitting device 22 and the light-receiving device 24 are arranged such that the offset between the center point c and the intersection C is no more than 10% of the distance between those devices. Similarly, letting an arrangement position of the light-emitting device 32 on the rotating unit 30 side be a', letting an arrangement position of the light-receiving device 34 be b', and letting a center point between a' and b' on a straight line between a' and b' (the straight line LB in FIG. 1A) be c', the devices are positioned such that a rotational axis position y' (the intersection (and center of rotation) C') on the rotating unit 30 satisfies the relationship $y'=c'\pm(a'-b')\times 0.1$.

Although the light guide member 40 is arranged between the facing surfaces of the fixed unit 20 and the rotating unit 30 in the present embodiment, FIGS. 1B-1 and 1B-2 illustrate a rotary joint 100 according to a comparison example that does not include the light guide member. As illustrated in FIG. 1B-1, when the light-emitting device 22 of the fixed unit 20 and the light-receiving device 34 of the rotating unit 30 are at positions directly facing each other and the light-receiving device 24 of the fixed unit 20 and the light-emitting device 32 of the rotating unit 30 are at positions directly facing each other, the amount of light received by the light-receiving devices 24 and 34 is maximized. However, as illustrated in FIG. 1B-2, when the rotating unit 30 rotates 180° around the center axis X from the state illustrated in FIG. 1B-1, the offset between the optical axes is maximized and the amount of light received is minimized. FIG. 2A is a plan view illustrating the rotating unit 30 as viewed from the fixed unit 20 side, and FIG. 2B illustrates the changes in the position of the light-receiving device 34 when the rotating unit 30 is rotated.

When the light guide member 40 is not included, the amount of light received changes according to the angle of rotation of the rotating unit 30 relative to the fixed unit 20. In other words, the amount of light received is largest near the position at which the amount of optical axis offset between the light-emitting device 22 of the fixed unit 20 and the light-receiving device 34 of the rotating unit 30 and the amount of optical axis offset between the light-receiving device 24 of the fixed unit 20 and the light-emitting device 32 of the rotating unit 30 are smallest, and conversely, the amount of light received is smallest near the position at which the amounts of optical axis offset are largest. That is, the amount of light received by the light-receiving devices 24 and 34 is not stable relative to the angle of rotation of the rotating unit 30 relative to the fixed unit 20.

Therefore, in the present embodiment, the substantially cylindrical light guide member 40 is arranged between the facing surfaces of the fixed unit 20 and the rotating unit 30, and the light that enters one end of the light guide member 40 is totally reflected within the light guide member 40 and is then emitted from the other end as light having a nearly uniform intensity distribution. This reduces decreases in the amount of light received by the light-receiving devices 24 and 34, thereby making it possible to maintain the stable amount of received light required for communications even near the positions at which the amounts of optical axis offset are largest. A transparent acrylic rod or the like can be used for the light guide member 40, for example. Here, the amount of light received by the light-receiving devices 24 and 34 varies according to factors such as the distance between the light-emitting device 22 and the light-receiving device 24, the distance between the light-emitting device 32 and the light-receiving device 34, and the communication distance that needs to be maintained, and therefore the diameter $\phi$ and length L of the light guide member 40 are set to the optimal values for the requirements at hand.

Next, an example of configuring optical specifications for the present embodiment will be described. Note that the values given here are only examples and may be appropriately modified as necessary. First, the minimum amount of light required to achieve 100 Mbps communications, for example, is derived. FIG. 3A illustrates the relationship between communication distance (in mm) and the amount of light received (in volts). As shown in FIG. 3A, generally, the longer the distance, the smaller the amount of light received becomes. Suppose that in order to achieve 100 Mbps communications, the minimum amount of light received is "r" volts. Then, FIG. 3A shows that the distance between the light emitting device and the light receiving device must be less than "d." Next, as illustrated in FIG. 3B, for various light guide member 40 configurations of different diameters $\phi$ and lengths L (lines GA to GD in the figure), the amount of light received by the light-receiving device 34 is measured as the arrangement position of the light-receiving device 34 is modified to change the amount of optical axis offset. The configurations of GA, GB, GC, and GD are as follows: GA, $\phi$25 mm/L50 mm; GB, $\phi$25 mm/L30 mm; GC, ϕ30 mm/L50 mm; and GD, ϕ30 mm/L30 mm. The horizontal axis in FIG. 3B shows the installation position of the light receiving device 34 as measured as a distance from the center C'. The vertical axis of FIG. 3B shows the amount the light received at the light receiving device 34 when the light emitting device 22 is positioned opposite to the light-receiving device 34 (i.e., maximally offset position). Because the amount of the received light is at the minimum in this configuration, if the amount of light received in this configuration satisfies the requisite amount "r," then the amount of light would be sufficient for all rotational positions of the light-receiving device 34. As shown in FIG. 3B, when the light-receiving device 34 is arranged at the position boxed within the solid line in FIG. 3B, the amount of light is always insufficient even when the configurations of the light guide member 40 are changed (i.e., none of GA through GD meets the requirement). However, as the installation location of the light-receiving device 34 approaches the intersection (center of rotation) C' (the position circled within the dashed line in FIG. 3B), the configurations GD and GB make it possible to receive more light than the minimum amount of light required for the communications (although GA and GC are still insufficient). Therefore, moving the installation position of the light-receiving device 34 closer to the intersection C' and adjusting the diameter ϕ and length L of the light guide member 40 makes it possible to always receive more light than the threshold value "r." Moreover, although this is not shown in FIGS. 3A and 3B, it was confirmed that the amount of light is insufficient when the light guide member 40 is not present.

Factors that determine the diameter ϕ and length L of the light guide member 40 include the following.

(a) Increases in the diameter ϕ or length L increase the distance signal light has to travel within the light guide member 40, which attenuates the light.

(b) Increases in the diameter ϕ or decreases in the length L decrease the number of times the signal light is totally reflected within the light guide member 40, which creates variations in the signal light emitted from the end faces of the light guide member 40. This causes the amount of light received to vary according to the position of the light-receiving device 34, which makes rotational positions in which the amount of received light is reduced more likely to exist.

(c) Decreases in the diameter ϕ reduce the amount of signal light that enters the end faces of the light guide member 40, which decreases the amount of light received by the light-receiving device 34.

These factors change the amount of light received by the light-receiving device 34, and therefore the diameter ϕ and length L of the light guide member 40 are designed as appropriate.

<Usage Example>

Figure 4A:
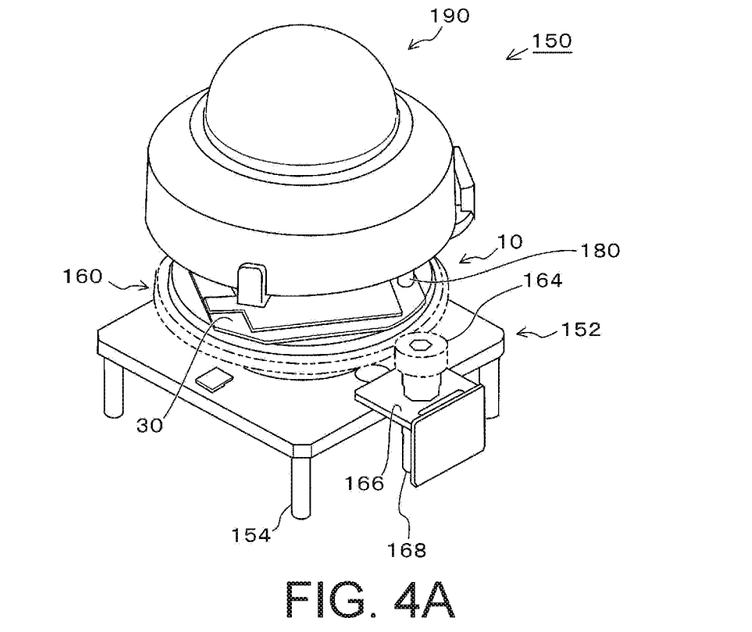
FIG. 4A is an exterior perspective view and FIG. 4B is a cross-sectional view of the primary components.
Figure 4B:
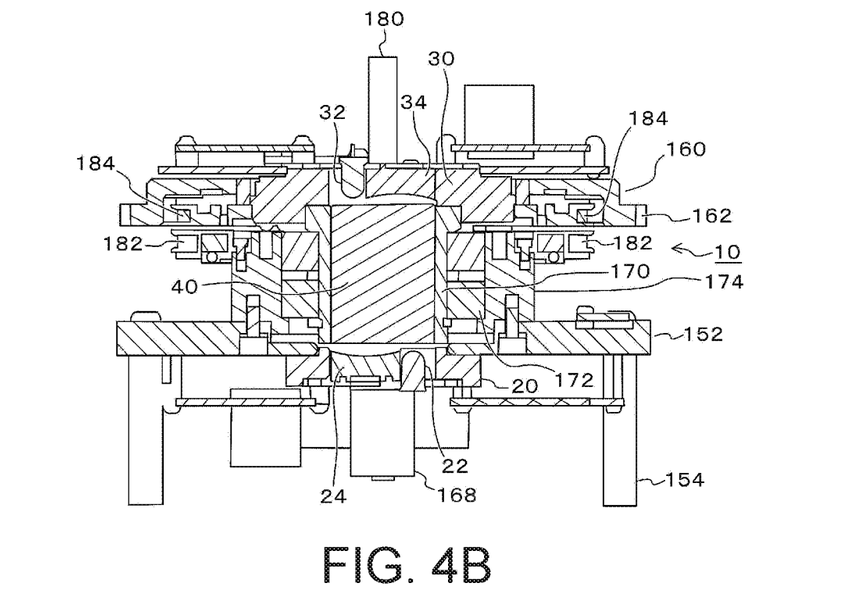

FIG. 4A is an exterior perspective view of a security camera 150 that uses the rotary joint 10 according to the present embodiment, and FIG. 4B is a cross-sectional view of the primary components of the rotary joint 10. As illustrated in FIGS. 4A and 4B, the rotary joint 10 is arranged on a stand 152 that is supported by a plurality of legs 154. A gear 160 having teeth 162 is arranged around the periphery of the rotating unit 30, and a gear 164 that is rotatably supported by a plate 166 is arranged next to the stand 152. The gear 164 engages the rotating unit 30-side gear 160 and is driven by a motor 168. Moreover, the light guide member 40 described above is arranged between the fixed unit 20 and the rotating unit 30, and the periphery of the light guide member 40 is rotatably supported by substantially tube-shaped supports 170, 172, and 174. Furthermore, a camera 190 is attached via a leg 180 to the upper surface side of the rotating unit 30. In this security camera 150, signals transmitted from the fixed unit 20 to the rotating unit 30 are control signals, and signals transmitted from the rotating unit 30 to the fixed unit 20 are image signals, for example.

In addition, in the present embodiment, power is supplied from the fixed unit 20 to the rotating unit 30 using two coils arranged beneath the gear 160 to supply power in a contactless manner via electromagnetic induction. The coils include a power transmitting coil 182 and a power receiving coil 184 for supplying power in a contactless manner. The power transmitting coil 182 and the power receiving coil 184 are respectively bundled into ring shapes each having an inner diameter and an outer diameter. In the example illustrated in the figure, the power transmitting coil 182 is arranged on the fixed unit 20 side, and the power receiving coil 184 is arranged on the rotating unit 30 side. Moreover, a joint mechanism (the substantially tube-shaped support 174 described above) is fitted into the inner diameter portions of the coils 182 and 184, and light is transmitted and received within the support 174 by the light-emitting devices 22 and 32 and the light-receiving devices 24 and 34 to achieve data communication.

The inner diameters of the power transmitting coil 182 and the power receiving coil 184 correspond to the outer diameter of the rotary joint 10 in size, and therefore decreasing the diameter of the joint mechanism (the support 174) makes it possible to reduce the diameters of the coils 182 and 184. This makes it possible to reduce the diameter of the rotary joint 10 that has communication and power supply features. Moreover, although FIG. 4B depicts the power receiving coil 184 and the power transmitting coil 182 as being arranged to respectively have different numbers of windings and coil diameters, these coils may be arranged to have the same numbers of windings, coil diameters, and coil wire diameters. Moreover, the windings may be formed by being wound around bobbins.

Figure 6:
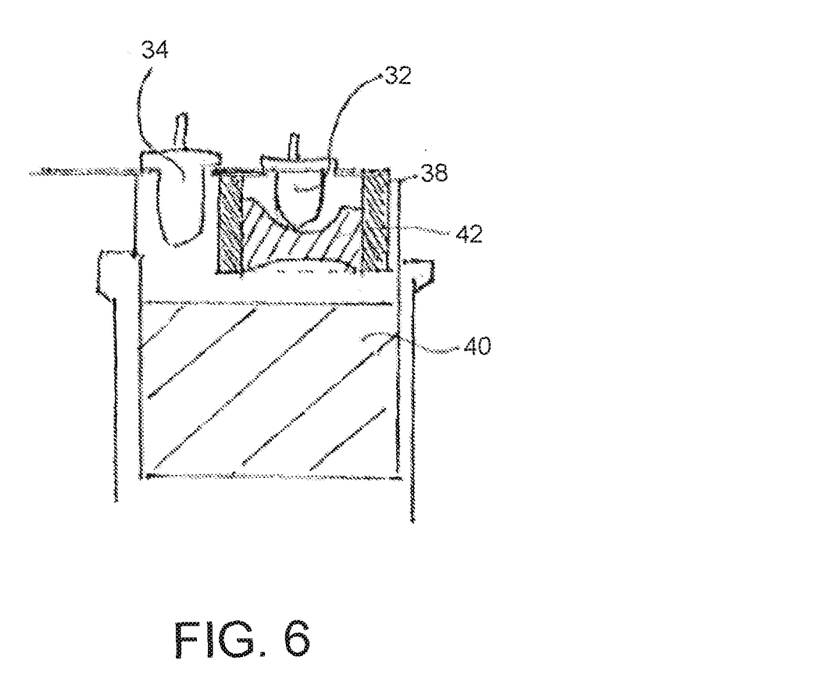
FIG. 6 is a cross-sectional view of a reflector provided for a light-emitting device according to an embodiment of the present invention.

As described above, in Embodiment 1, the fixed unit 20 of the rotary joint 10 includes the light-emitting device 22 and the light-receiving device 24, and the rotating unit 30 that faces the fixed unit 20 includes the light-emitting device 32 and the light-receiving device 34. The intersection C of the center axis X and the fixed unit 20 is positioned at the center position of the light-emitting device 22 and the light-receiving device 24, and the intersection (center of rotation) C' of the center axis X and the rotating unit 30 is positioned at the center position of the light-emitting device 32 and the light-receiving device 34. Moreover, the substantially cylindrical light guide member 40 is arranged between the fixed unit 20 and the rotating unit 30. As described above, a reflector 38 may be provided in one of or each of the light-emitting devices 22 and 32. In that case, as shown in FIG. 6, the structure surrounding the light-emitting device 22/32 and the light-receiving device 24/34 in FIG. 4B may be replaced with the structure shown in FIG. 6. As shown in FIG. 6, this exemplary reflector 38 has a cylindrical shape enclosing the light-emitting device 22/32, and is accompanied by a concave lens 42. The following effects are obtained with these structural features.

(1) The intersections C and C' of the center axis X and the fixed unit 20 and rotating unit 30 are arranged at the center positions of the light-emitting devices and the light-receiving devices, thereby making it possible to reduce the size and diameter of the joint.

(2) The light guide member 40 is arranged between the fixed unit 20 and the rotating unit 30, and therefore even when optical axis offsets occur between the light-emitting devices and the light-receiving devices on the fixed side and the rotating side due to the rotation of the rotating unit 30, the light is reflected within the light guide member 40 and a the light-emitting devices 24 and 34 receive a stable and consistent amount of light, thereby making it possible to achieve stable communications.

(3) No high-precision adjustments are required for the optical axes, the light guide member 40, the light-emitting devices 22 and 32, or the light-receiving devices 24 and 34, thereby making it possible to reduce costs.

(4) The reflectors 38 are arranged near the light-emitting devices 22 and 32 as necessary, thereby making it possible to adjust the signal light emission range.

(5) The power transmitting coil 182 is arranged on the fixed unit 20 side and the power receiving coil 184 is arranged on the rotating unit 30 side to supply power in a contactless manner, thereby making it possible to reduce the size of the rotary housing.

Furthermore, the present invention is not limited to the embodiment described above, and various modifications may be made without departing from the spirit of the present invention. Examples of such modifications include the following.

(1) The shapes and dimensions described in the embodiment above are only examples and may be appropriately modified as necessary. The materials used may also be modified as appropriate as long as the same effects as in Embodiment 1 can still be achieved. For example, although an acrylic resin is used for the light guide member 40 in the embodiment described above, this is only an example and does not preclude use of other resins, glasses, or the like. Moreover, the arrangement positions of the devices in the embodiment as described above (see FIG. 2B, for example) are also only examples. These positions are not limited to the examples described above and may be appropriately modified as necessary.

(2) In the embodiment described above, in the direction sandwiching the light guide member 40, the fixed unit 20 is arranged on one side and the rotating unit 30 is arranged on the other side. However, this is also only an example, and the present invention may be applied to any configuration in which members rotate relative to one another. In other words, as long as a first member and a second member are arranged facing one another, either one may rotate or both may rotate.

(3) In the embodiment described above, the end faces of the light guide member 40 are configured to be optically smooth surfaces. Moreover, inner faces may be mirror faced. However, this is only an example, and protrusions or recesses may be formed in the end faces or inner faces to create lens or diffusion effects.

(4) Although the fixed unit 20 and the rotating unit 30 both include a single pair of a light-emitting device and a light-receiving device in the embodiment as described above, this is only an example and does not preclude the fixed unit 20 and the rotating unit 30 from respectively including two or more pairs of light-emitting devices and light-receiving devices. Moreover, a plurality of light-emitting devices may be included for each one light-receiving device, or vice versa.

(5) A filter may be included to avoid self-interference. Moreover, the light guide member 40 itself may be colored to act as a filter.

(6) In the embodiment described above, the optimal values for the diameter φ and length L of the light guide member 40 are determined according to the communication distance associated with the arrangement of the devices. However, this is only an example, and alternatively the diameter φ and length L of the light guide member 40 may be fixed and the diameters and emission angles of the reflectors 38 may be modified to determine an arrangement for the light-emitting devices and the light-receiving devices that makes it possible to maintain the amount of light required for communications. Moreover, depending on the obtained conditions such as communication distance, it may be possible to remove the light guide member 40. In other words, the reflectors 38 may be used as a light reception amount securing unit.

(7) In the embodiment described above, the present invention is applied to the rotary joint 10. However, this is only an example, and the present invention can be applied to any device configured to utilize optical signals to implement bidirectional signal transmission between two components that rotate relative to one another. Moreover, the security camera described in the embodiment above is also only an example, and the present invention can be applied to various types of well-known electronic apparatuses such as gaming devices and industrial robots.

INDUSTRIAL APPLICABILITY

The present invention includes: a first member and a second member arranged substantially orthogonal to a same axis and facing one another, the first member and the second member being rotatable about the axis relative to one another; and light-emitting devices and light-receiving devices arranged on respective facing surfaces of the first member and the second member at positions offset from intersections with the axis. Moreover, light emitted from a light-emitting device of the first member is received by a light-receiving device of the second member, light emitted from a light-emitting device of the second member is received by a light-receiving device of the first member, and the present invention further includes a light reception amount securing unit that ensures that the light-receiving devices receive an amount of light required for communication even when optical axis offsets occur due to relative rotation between the first member and the second member. This makes it possible to achieve reductions in size and diameter while the light-receiving devices still receive a stable and consistent amount of light, and is therefore suitable for use in a bidirectional optical signal transmission device. The present invention is particularly well-suited to use in an optical transmission rotary joint or the like that utilizes optical signals to implement bidirectional signal transmission in rotating security cameras or between a rotating unit of an industrial robot and a fixed unit that supports the rotating unit.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An optical signal transmission device, comprising:
a first unit and a second unit arranged substantially orthogonal to a same axis and facing one another, the first unit and the second unit being relatively rotatable to each other about said axis;
an optical unit between the first unit and the second unit,
wherein each of the first and second units has a single pair of a light-emitting device and a light-receiving device arranged on a surface thereof facing the other one of the first and second units, the light-emitting device and the light-receiving device being respectively positioned separately from an intersecting point on said surface that intersects with said axis, each of the first and second units having no other light-emitting device or light-receiving device than said single pair, an optical axis of the light-emitting device in each of the first and second units being in parallel with said axis, and
wherein the optical unit is configured such that light emitted from the light-emitting device on the first unit is guided to, and is received by, the light-receiving device on the second unit, and light emitted from the light-emitting device on the second unit is guided to, and is received by, the light-receiving device on the first unit, and such that an amount of the light so received by the light-receiving device on the first unit and an amount of the light so received by the light-receiving device on the second unit both exceed a prescribed minimum amount regardless of relative rotational positions of the first unit and the second unit with respect to each other.

2. The optical signal transmission device according to claim 1, wherein the optical unit includes a light guide member interposed between the first unit and the second unit.

3. The optical signal transmission device according to claim 2, wherein the optical unit further includes a reflector arranged around the light-emitting device on the first unit and another reflector arranged around the light-emitting device on the second unit, each reflector regulating a light emission range.

4. The optical signal transmission device according to claim 1, wherein the optical unit includes a reflector arranged around the light-emitting device on the first unit and another reflector arranged around the light-emitting device on the second unit, each reflector regulating a light emission range.

5. The optical signal transmission device according to claim 1, wherein each light-emitting device is a light-emitting diode.

6. The optical signal transmission device according to claim 1,
wherein an intersection of the first unit and said axis is located at a substantially center position on a straight line between the light-emitting device and the light-receiving device on the first unit,
wherein an intersection of the second unit and said axis is located at a substantially center position on a straight line between the light-emitting device and the light-receiving device on the second unit, and
wherein the straight line on the first unit and the straight line on the second unit are configured to have substantially equal lengths.

7. The optical signal transmission device according to claim 1, wherein one of the first and second units has a power transmitting coil, and another of the first and second units has a power receiving coil so that power is supplied in a contactless manner between the first and second units.

8. The optical signal transmission device according to claim 1,
wherein the optical unit includes a light guide member interposed between the first unit and the second unit, the light guide member having a substantially cylindrical shape centering around said axis, and
wherein the second unit is fixed relative to the optical unit, and the first unit is rotatable relative to the optical unit and the second unit.

9. An electronic apparatus including the optical signal transmission device according to claim 1.

10. The optical signal transmission device according to claim 3, wherein each reflector has a cylindrical shape enclosing the corresponding light-emitting device.

11. The optical signal transmission device according to claim 10, wherein a concave lens is provided in front of each light-emitting device.

12. An optical signal transmission device, comprising:
a first unit and a second unit arranged substantially orthogonal to a same axis and facing one another, the first unit and the second unit being relatively rotatable to each other about said axis;
an optical unit between the first unit and the second unit,
wherein each of the first and second units has a light-emitting device and a light-receiving device arranged on a surface thereof facing the other one of the first and second units, the light-emitting device and the light-receiving device being respectively positioned separately from an intersecting point on said surface that intersects with said axis,
wherein the optical unit is configured such that light emitted from the light-emitting device on the first unit is guided to, and is received by, the light-receiving device on the second unit, and light emitted from the light-emitting device on the second unit is guided to, and is received by, the light-receiving device on the first unit, and such that an amount of the light so received by the light-receiving device on the first unit and an amount of the light so received by the light-receiving device on the second unit both exceed a prescribed minimum amount regardless of relative rotational positions of the first unit and the second unit with respect to each other,
wherein the optical unit includes a light guide member interposed between the first unit and the second unit, the light guide member having a substantially cylindrical shape centering around said axis and having a circular-shaped top surface and a circular-shaped bottom surface, the circular-shaped top surface facing both of the light-emitting device and the light-receiving device on the first unit and the circular-shaped bottom surface facing both of the light-emitting device and the light-receiving device on the second unit, and
wherein the second unit is fixed relative to the optical unit, and the first unit is rotatable relative to the optical unit and the second unit.

* * * * *